(12) United States Patent
Lee et al.

(10) Patent No.: US 10,632,711 B2
(45) Date of Patent: Apr. 28, 2020

(54) WINDOW FOR FLEXIBLE DISPLAY DEVICE AND FLEXIBLE DISPLAY DEVICE HAVING THE SAME

(71) Applicant: Samsung Display Co., Ltd, Yongin-si, Gyeonggi-do (KR)

(72) Inventors: Jeoung Sub Lee, Seoul (KR); Heon Jung Shin, Hwaseong-si (KR); Hyun Joon Oh, Seongnam-si (KR); Hye-Jin Oh, Asan-si (KR); Min-Hoon Choi, Seoul (KR); Kyung Tae Kim, Asan-si (KR); Bo A Kim, Icheon-si (KR); Sang Hoon Kim, Hwaseong-si (KR); Sang-Il Park, Yongin-si (KR)

(73) Assignee: Samsung Display Co., Ltd. (KR)

( * ) Notice: Subject to any disclaimer, the term of this patent is extended or adjusted under 35 U.S.C. 154(b) by 105 days.

(21) Appl. No.: 15/791,051

(22) Filed: Oct. 23, 2017

(65) Prior Publication Data
US 2018/0134007 A1    May 17, 2018

(30) Foreign Application Priority Data
Nov. 16, 2016    (KR) ........................ 10-2016-0152826

(51) Int. Cl.
*B32B 3/24*    (2006.01)
*B32B 7/02*    (2019.01)
(Continued)

(52) U.S. Cl.
CPC .............. *B32B 3/266* (2013.01); *B32B 7/022* (2019.01); *B32B 7/12* (2013.01); *B32B 25/08* (2013.01); *B32B 25/20* (2013.01); *B32B 27/06* (2013.01); *B32B 27/325* (2013.01); *G06F 1/1641* (2013.01); *G06F 1/1652* (2013.01);
(Continued)

(58) Field of Classification Search
None
See application file for complete search history.

(56) References Cited

U.S. PATENT DOCUMENTS

2005/0259189 A1* 11/2005 Bouten ............. G02F 1/133305
                                                            349/1
2006/0132025 A1*  6/2006 Gao ........................ H01L 51/52
                                                            313/503
(Continued)

FOREIGN PATENT DOCUMENTS

CN    103955306 A  *  7/2014
CN    105280836 A  *  1/2016
(Continued)

OTHER PUBLICATIONS

Machine Translation of JP 2005189303 A, Jul. 2005 (Year: 2005).*
(Continued)

*Primary Examiner* — Jeffrey A Vonch
(74) *Attorney, Agent, or Firm* — Innovation Counsel LLP

(57) ABSTRACT

The present disclosure relates to a window for a flexible display device, including: a first film including a transparent base film and a plurality of holes passing through the transparent base film; a second film overlapping the first film; a buffer layer between the first film and the second film to attach a first side of the first film and a first side of the second film; and a hard coated layer on a second side of the second film.

16 Claims, 8 Drawing Sheets

(51) Int. Cl.

| | | |
|---|---|---|
| *B32B 7/12* | (2006.01) | |
| *B32B 25/08* | (2006.01) | |
| *B32B 25/20* | (2006.01) | |
| *B32B 27/06* | (2006.01) | |
| *G09F 9/30* | (2006.01) | |
| *G06F 1/16* | (2006.01) | |
| *B32B 3/26* | (2006.01) | |
| *B32B 27/32* | (2006.01) | |
| *B32B 7/022* | (2019.01) | |
| *G02F 1/1333* | (2006.01) | |
| *B32B 27/28* | (2006.01) | |
| *B32B 23/04* | (2006.01) | |
| *B32B 23/20* | (2006.01) | |
| *B32B 23/08* | (2006.01) | |
| *B32B 27/40* | (2006.01) | |
| *B32B 27/36* | (2006.01) | |
| *B32B 27/08* | (2006.01) | |
| *C09J 183/00* | (2006.01) | |
| *C09J 9/00* | (2006.01) | |
| *B32B 33/00* | (2006.01) | |

(52) U.S. Cl.
CPC ............... *B32B 3/26* (2013.01); *B32B 23/04* (2013.01); *B32B 23/046* (2013.01); *B32B 23/08* (2013.01); *B32B 23/20* (2013.01); *B32B 27/08* (2013.01); *B32B 27/281* (2013.01); *B32B 27/283* (2013.01); *B32B 27/32* (2013.01); *B32B 27/36* (2013.01); *B32B 27/365* (2013.01); *B32B 27/40* (2013.01); *B32B 33/00* (2013.01); *B32B 2250/04* (2013.01); *B32B 2250/05* (2013.01); *B32B 2250/24* (2013.01); *B32B 2255/10* (2013.01); *B32B 2255/20* (2013.01); *B32B 2255/24* (2013.01); *B32B 2307/412* (2013.01); *B32B 2307/51* (2013.01); *B32B 2307/546* (2013.01); *B32B 2307/558* (2013.01); *B32B 2307/732* (2013.01); *B32B 2317/18* (2013.01); *B32B 2319/00* (2013.01); *B32B 2323/04* (2013.01); *B32B 2333/12* (2013.01); *B32B 2367/00* (2013.01); *B32B 2369/00* (2013.01); *B32B 2375/00* (2013.01); *B32B 2379/00* (2013.01); *B32B 2383/00* (2013.01); *B32B 2398/00* (2013.01); *B32B 2457/20* (2013.01); *C09J 9/00* (2013.01); *C09J 183/00* (2013.01); *G02F 2001/133331* (2013.01); *G09F 9/301* (2013.01); *Y10T 428/24331* (2015.01); *Y10T 428/24942* (2015.01); *Y10T 428/24983* (2015.01)

(56) References Cited

U.S. PATENT DOCUMENTS

| | | | | |
|---|---|---|---|---|
| 2008/0218369 A1* | 9/2008 | Krans | ............... | A47G 9/1045 340/691.1 |
| 2010/0028608 A1* | 2/2010 | Choi | ............... | G02F 1/1333 428/158 |
| 2010/0221521 A1* | 9/2010 | Wagner | ............... | B01F 17/0028 428/315.5 |
| 2013/0034685 A1* | 2/2013 | An | ............... | H01L 51/524 428/121 |
| 2013/0177748 A1* | 7/2013 | Hirai | ............... | B32B 27/08 428/203 |
| 2013/0250498 A1* | 9/2013 | Shon | ............... | H05K 5/0017 361/679.01 |
| 2014/0029212 A1* | 1/2014 | Hwang | ............... | G09F 9/301 361/749 |
| 2014/0050909 A1* | 2/2014 | Choi | ............... | B32B 7/12 428/217 |
| 2014/0065326 A1* | 3/2014 | Lee | ............... | G06F 1/16 428/12 |
| 2014/0077181 A1* | 3/2014 | Kim | ............... | G02F 1/133608 257/40 |
| 2014/0287213 A1* | 9/2014 | Lee | ............... | G02F 1/133308 428/217 |
| 2014/0295150 A1* | 10/2014 | Bower | ............... | C09J 5/00 428/201 |
| 2014/0295157 A1* | 10/2014 | Hirai | ............... | B32B 27/08 428/215 |
| 2015/0004345 A1* | 1/2015 | Chaung | ............... | B32B 7/14 428/41.7 |
| 2015/0024170 A1* | 1/2015 | Min | ............... | B32B 3/263 428/172 |
| 2015/0029648 A1* | 1/2015 | Kim | ............... | B29C 65/4815 361/679.3 |
| 2015/0043174 A1* | 2/2015 | Han | ............... | G02F 1/13452 361/749 |
| 2015/0086740 A1* | 3/2015 | Shin | ............... | B32B 37/0076 428/41.8 |
| 2015/0086763 A1* | 3/2015 | Nam | ............... | H01L 51/524 428/212 |
| 2015/0090969 A1* | 4/2015 | Han | ............... | H01L 51/524 257/40 |
| 2015/0116959 A1* | 4/2015 | Namkung | ............... | G06F 1/1652 361/749 |
| 2015/0147532 A1* | 5/2015 | Nam | ............... | G02B 26/005 428/172 |
| 2015/0181731 A1* | 6/2015 | Lin | ............... | B32B 37/12 361/749 |
| 2015/0200375 A1* | 7/2015 | Kim | ............... | G09F 9/301 257/40 |
| 2015/0201487 A1* | 7/2015 | Kee | ............... | G02F 1/133305 361/749 |
| 2015/0207102 A1* | 7/2015 | Jeong | ............... | H01L 51/5256 257/40 |
| 2015/0212547 A1* | 7/2015 | Park | ............... | G06F 1/1652 349/12 |
| 2015/0268697 A1* | 9/2015 | Nam | ............... | G06F 1/1652 428/157 |
| 2016/0014881 A1* | 1/2016 | Shin | ............... | G06F 1/1652 361/749 |
| 2016/0048171 A1* | 2/2016 | Lee | ............... | G06F 1/1652 361/679.27 |
| 2016/0101593 A1* | 4/2016 | Nam | ............... | B32B 3/04 428/213 |
| 2016/0155967 A1* | 6/2016 | Lee | ............... | H01L 51/5281 257/88 |
| 2016/0187931 A1* | 6/2016 | Myung | ............... | G06F 1/1652 361/679.3 |
| 2016/0271914 A1* | 9/2016 | Xie | ............... | B32B 27/302 |
| 2016/0295685 A1* | 10/2016 | Ryu | ............... | G06F 1/1652 |
| 2016/0297178 A1* | 10/2016 | Kang | ............... | C08J 7/042 |
| 2016/0303843 A1* | 10/2016 | Jang | ............... | B32B 37/0084 |
| 2016/0323966 A1* | 11/2016 | Hamel | ............... | H05B 33/26 |
| 2016/0357052 A1* | 12/2016 | Kim | ............... | H01L 51/5237 |
| 2016/0380033 A1* | 12/2016 | Lee | ............... | H01L 27/323 257/40 |
| 2017/0028677 A1* | 2/2017 | Lee | ............... | B32B 7/12 |
| 2017/0092884 A1* | 3/2017 | Zhang | ............... | H01L 51/0097 |
| 2017/0153668 A1* | 6/2017 | Jang | ............... | G06F 1/1641 |
| 2017/0155084 A1* | 6/2017 | Park | ............... | H01L 51/0097 |
| 2017/0196101 A1* | 7/2017 | Ki | ............... | H05K 5/0017 |
| 2017/0199547 A1* | 7/2017 | Jeong | ............... | B32B 3/28 |
| 2017/0263889 A1* | 9/2017 | Seki | ............... | H01L 51/0097 |
| 2017/0309843 A1* | 10/2017 | Kim | ............... | B32B 3/26 |
| 2017/0309867 A1* | 10/2017 | Mun | ............... | C09J 133/066 |
| 2017/0315645 A1* | 11/2017 | Park | ............... | G06F 3/0412 |
| 2017/0373121 A1* | 12/2017 | Leng | ............... | H01L 27/32 |
| 2018/0063980 A1* | 3/2018 | Shin | ............... | H05K 5/03 |
| 2018/0074551 A1* | 3/2018 | Hong | ............... | G06F 1/1641 |
| 2018/0088392 A1* | 3/2018 | Park | ............... | B32B 7/12 |
| 2018/0093462 A1* | 4/2018 | Liu | ............... | B32B 9/04 |
| 2018/0096635 A1* | 4/2018 | Park | ............... | G09F 9/33 |
| 2018/0153049 A1* | 5/2018 | Song | ............... | G06F 1/1601 |

(56) References Cited

U.S. PATENT DOCUMENTS

| | | | |
|---|---|---|---|
| 2018/0217639 A1* | 8/2018 | Jones | H05K 1/0306 |
| 2019/0191543 A1* | 6/2019 | Han | H05K 1/028 |
| 2019/0237689 A1* | 8/2019 | Liu | G06F 1/1616 |

FOREIGN PATENT DOCUMENTS

| | | | | |
|---|---|---|---|---|
| JP | 2005189303 A | * | 7/2005 | |
| JP | 2013035210 A | * | 2/2013 | |
| JP | 2015105993 A | * | 6/2015 | |
| KR | 10-2015-0077134 A | | 7/2015 | |
| KR | 10-2015-0088101 A | | 7/2015 | |
| KR | 20150077134 A | * | 7/2015 | |
| KR | 20150115122 A | * | 10/2015 | |
| KR | 10-2016-0042360 A | | 4/2016 | |
| KR | 10-1659239 B1 | | 9/2016 | |

OTHER PUBLICATIONS

Machine Translation of KR 20150115122 A, Oct. 2015 (Year: 2015).*
Gleskova, Failure Resistance of Amorphous Silicon Transistors Under Extreme In-Plane Strain, Applied Physics Letters, Nov. 8, 1999, pp. 3011-3013, vol. 75, No. 19, American Institute of Physics.
Tian, Study of Shear-Stiffened Elastomers, Smart Materials and Structures, Oct. 31, 2012, pp. 1-6, IOP Publishing Ltd., United Kingdom & United States.

* cited by examiner

WINDOW FOR FLEXIBLE DISPLAY DEVICE AND FLEXIBLE DISPLAY DEVICE HAVING THE SAME

CROSS-REFERENCE TO RELATED APPLICATION

This application claims priority to and the benefit of Korean Patent Application No. 10-2016-0152826 filed in the Korean Intellectual Property Office on Nov. 16, 2016, the entire contents of which are incorporated herein by reference.

TECHNICAL BACKGROUND

(a) Technical Field

The present disclosure relates to a window for a flexible display device and a flexible display device including the same.

(b) Description of the Related Art

As the display market has recently developed, second-generation "foldable" displays have appeared after first-generation "curved" displays that may be bent, and the appearance of third-generation "rollable" displays has been announced.

A role of the flexible display device is very important in the appearance of the new-generation displays. The flexible display device represents a display device that is very flexible and is relatively freely deformed.

The flexible display device must have a freely deformable property so as to have flexibility, and it must also have hardness or rigidity for protection from an external impact so as to have durability.

Therefore, needs for the two kinds of performance are gradually increasing, and studies for acquiring the same are steadily progressing.

The above information disclosed in this Background section is only for enhancement of understanding of the background and therefore it may contain information that does not form the prior art that is already known in this country to a person of ordinary skill in the art.

SUMMARY

The present disclosure has been made in an effort to provide a window for a flexible display device for improving a characteristic of impact resistance and having a small curvature radius to be used for a flexible display device, and a flexible display device including the same.

The technical feature to be achieved by the present disclosure is not limited to the aforementioned technical feature, and other unmentioned technical features will be obviously understood by those skilled in the art from the description below.

An exemplary embodiment provides a window for a flexible display device, including: a first film including a base film and a plurality of holes passing through the base film; a second film overlapping the first film; a buffer layer between the first film and the second film to attach a first side of the first film and a first side of the second film; and a hard coated layer on a second side of the second film.

A cross-section of the holes in the first side of the first film and a cross-section of the holes in a second side of the first film may have a same column shape.

Areas of a cross-section of the holes in the first side of the first film and a cross-section of the holes in a second side of the first film facing the first side of the first film may be different from each other, such that the holes may have different truncated cone shapes.

A sum of volumes of the holes may be equal to or greater than 5% and equal to or less than 50% of a volume of the first film.

A thickness of the first film may be equal to or greater than 10 µm and equal to or less than 250 µm.

A modulus of the first film may be equal to or greater than 1.0 GPa and equal to or less than 1.5 GPa.

The buffer layer may include a material of which a storage modulus increases when an external force is applied.

The storage modulus of the buffer layer increasing by the external force may increase by a range that is equal to or greater than $10^4$ Pa and equal to or less than $10^5$ Pa.

The buffer layer may include a silicon oil.

A thickness of the buffer layer may be equal to or greater than 10 µm and equal to or less than 30 µm.

A thickness of the window may be equal to or greater than 100 µm and equal to or less than 300 µm.

A filler with a modulus that is less than a modulus of the base film may be filled in the holes.

The filler may include a transparent polymer.

A thickness of the second film may be equal to or greater than 10 µm and equal to or less than 60 µm.

A thickness of the hard coated layer may be equal to or greater than 10 µm and equal to or less than 60 µm.

Another embodiment provides a flexible display device including: a display panel; a window provided on a first side of the display panel; and a first adhesive layer provided between the display panel and the window and attaching the first side of the display panel and a first side of the window, wherein the window includes a first film including a base film and a plurality of holes passing through the base film, a second film overlapping the first film, a buffer layer between the first film and the second film to attach a first side of the first film and a first side of the second film, and a hard coated layer on a second side of the second film.

The flexible display device may further include: a protection film on a second side of the display panel; and a second adhesive layer between the display panel and the protection film to attach the second side of the display panel and a first side of the protection film.

According to the present disclosure, a window for a flexible display device and a flexible display device including the same are provided. The window allows the entire thickness of the flexible display device to be within a predetermined range, improves the characteristic of impact resistance, and has a small curvature radius.

DETAILED DESCRIPTION OF THE EMBODIMENTS

Figure 1:
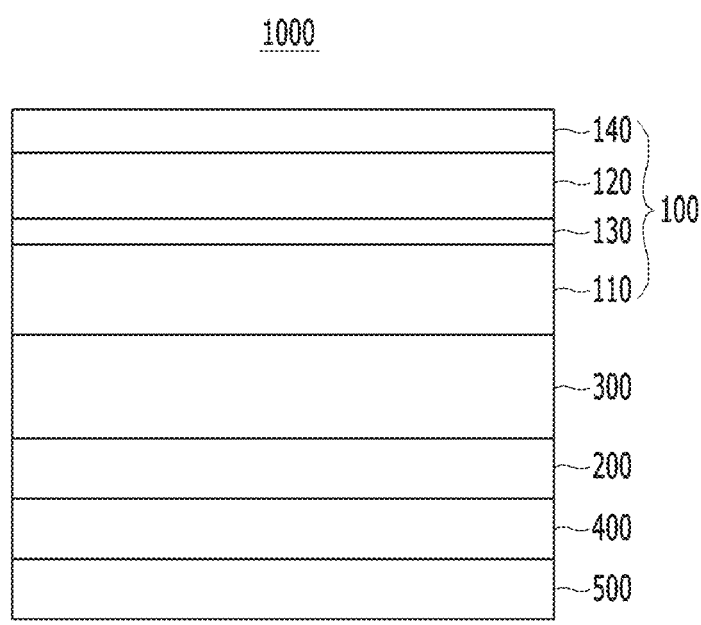
FIG. 1 shows a cross-sectional view of a stacking structure of a display device according to an exemplary embodiment.

Exemplary embodiments will be described in detail with reference to the accompanying drawings. In describing the inventive concept, a description of known functions or configurations will be omitted so as to make the subject matter of the inventive concept more clear.

To clearly describe the inventive concept, portions which do not relate to the description are omitted, and like reference numerals designate like elements throughout the specification. The size and thickness of each component shown in the drawings are arbitrarily shown for better understanding and ease of description, but the inventive concept is not limited thereto.

In the drawings, the thickness of layers, films, panels, regions, etc., are exaggerated for clarity. For better understanding and ease of description, the thickness of some layers and areas is exaggerated. It will be understood that when an element such as a layer, film, region, or substrate is referred to as being "on" another element, it can be directly on the other element or intervening elements may also be present.

FIG. 1 shows a cross-sectional view of a stacking structure of a display device 1000 according to an exemplary embodiment. As shown in FIG. 1, the flexible display device 1000 according to an exemplary embodiment includes a window 100.

Regarding the flexible display device 1000, a first adhesive layer 300 and a second adhesive layer 400 are provided on respective sides of a flexible display panel 200. According to the present exemplary embodiment, as shown in FIG. 1, the display panel 200 is bonded to the window 100 by the first adhesive layer 300, and the display panel 200 is bonded to a protection film 500 by the second adhesive layer 400.

The display panel 200, the first adhesive layer 300, the second adhesive layer 400, the protection film 500, and the window 100 are flexible so that they may be used for the flexible display device 1000.

As described above, the window 100 for a flexible display device is attached to a first side of the display panel 200 by the first adhesive layer 300 to protect the display panel 200 from external impacts. Particularly, to protect the display panel 200 from external impacts, the characteristic of impact resistance of a hard coated layer 140 is important. The hard coated layer 140 may be provided to the outermost side of the window 100 so that it may be directly exposed outside. Therefore, as the hard coated layer 140 directly receives any external impact, it must pass through an impact characteristic test such as a ball drop test or a pen drop test.

Particularly, when a sharp object such as a pen imparts an impact to a surface of the hard coated layer 140, the surface may be indented or cracked to deteriorate visibility and durability. Therefore, to prevent such a generation of defects, the characteristic of impact resistance of the window 100 including the hard coated layer 140 may be improved.

To improve the characteristic of impact resistance, when an impact is applied to the window 100, the impact transmission time must be delayed to reduce impact forces that are sequentially transmitted. To delay the impact transmission time, it is needed to increase a thickness of the window 100 or control a modulus. In one embodiment, the impact transmission time is the time that the impact on the window 100 is propagated through the window 100.

The window 100 includes a first film 110, a second film 120 overlapping the first film 110, a buffer layer 130 provided between the first film 110 and the second film 120 and bonding a first side of the first film 110 and a first side of the second film 120, and the hard coated layer 140 provided on a second side of the second film 120.

The first film 110 and the second film 120 are transparent and flexible films used for the window 100 of the flexible display device 1000. In detail, at least one of the first film 110 and the second film 120 may include at least one of a colorless polyimide (CPI), a thermoplastic polyurethane (TPU), a triacetyl cellulose (TAC) film, a polycarbonate (PC), a poly(methyl methacrylate) (PMMA), a cyclo-olefin polymer (COP), a polyurethane, silicon, a polyethylene terephthalate (PET), a polyethylene (PE), and an oriented polypropylene (OPP).

The buffer layer 130 is an adhesive layer including an adhesive material for bonding the first film 110 and the second film 120 between the first film 110 and the second film 120, and includes an elastic material for easing an impact by delaying an impact force transmission time when an external impact is applied.

Further, the buffer layer 130 and the hard coated layer 140 may be made of a transparent and flexible material so that they may be used for the window 100 of the flexible display device 1000. For example, they may include at least one of an organic material, an inorganic material, and an organic and inorganic hybrid material, but are not limited thereto.

As described above, to improve the characteristic of impact resistance of the window 100, the time for transmitting the impact force generated by the impact may increase by controlling the thicknesses and moduli of respective layers to ease the impact.

When the thicknesses of the first film 110, the second film 120, the buffer layer 130, and the hard coated layer 140 are to be increased, a limit on a maximum of the entire thickness and a limit on the curvature radius are provided. The thickness of the window 100 of the flexible display device 1000 is about equal to or greater than 100 μm and equal to or less than 300 μm, so there is a limit when the thicknesses of the respective layers are increased so as to improve the characteristic of impact resistance. Further, when the moduli of the respective layers are excessively reduced, the rigidity may be reduced, and when the moduli are excessively increased, this also becomes a limit on the curvature radius.

The window 100 for the flexible display device 1000 has a small curvature radius so that the entire thickness of the flexible display device 1000 may be maintained in a predetermined range and the characteristic of impact resistance of the flexible display device 1000 may be improved.

In further detail, the window 100 for the flexible display device 1000 has a curvature radius that is about equal to or greater than 1 mm and equal to or less than 5 mm. Therefore, the flexible display device 1000 may have a small curvature radius of about 1 mm and the characteristic of impact resistance may be improved.

Figure 2:
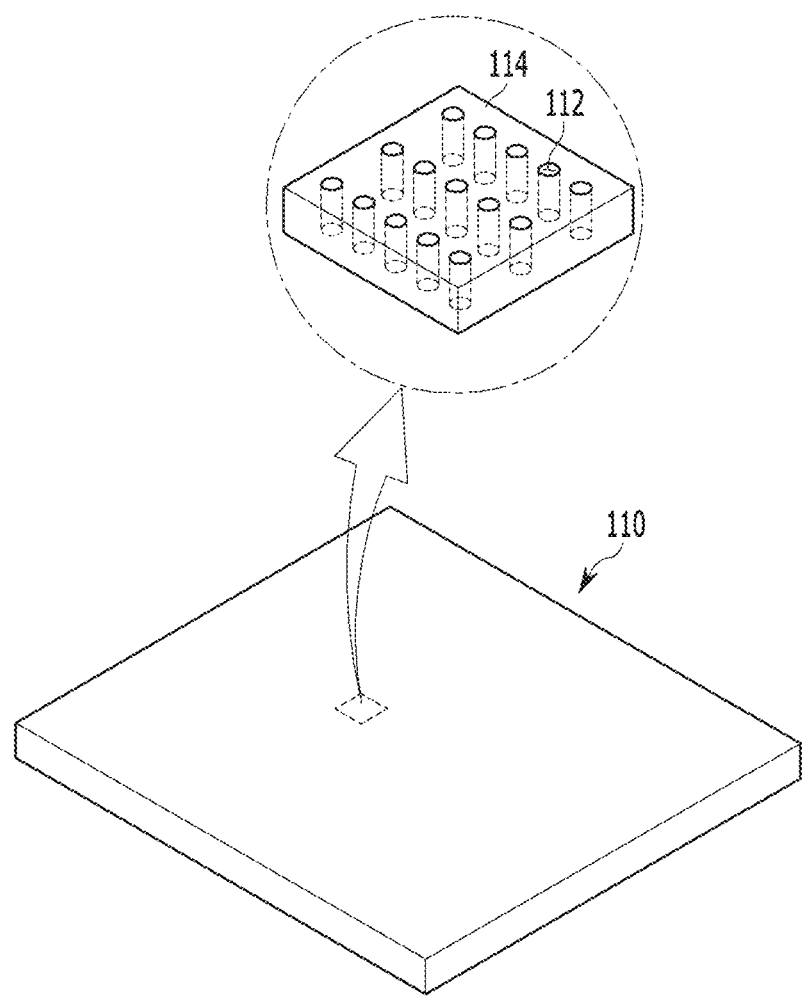
FIG. 2 shows a first film according to an exemplary embodiment.

FIG. 2 shows a first film 110 according to an exemplary embodiment.

As shown in FIG. 2, in detail, the first film 110 includes a transparent base film 114 and a plurality of holes 112 passing through the transparent base film 114 so as to maintain the optical characteristic.

The holes 112 may have a cross-section that is cut in parallel to the first side of the first film 110 and that may be one of a circle, an oval, and a polygon, or an unspecified shape, and in addition to this, they might not form a line with a smooth boundary or a curved line.

The holes 112 may have a column shape. For example, as shown in FIG. 2, a cross-sectional area of the hole 112 provided in the first side of the first film 110 may correspond to a cross-sectional area of the hole 112 provided in the second side of the first film 110 facing the first side of the first film 110, and a lateral side of the hole 112 provided inside the first film 110 may be perpendicular to the first and second sides of the first film 110.

Figure 3:
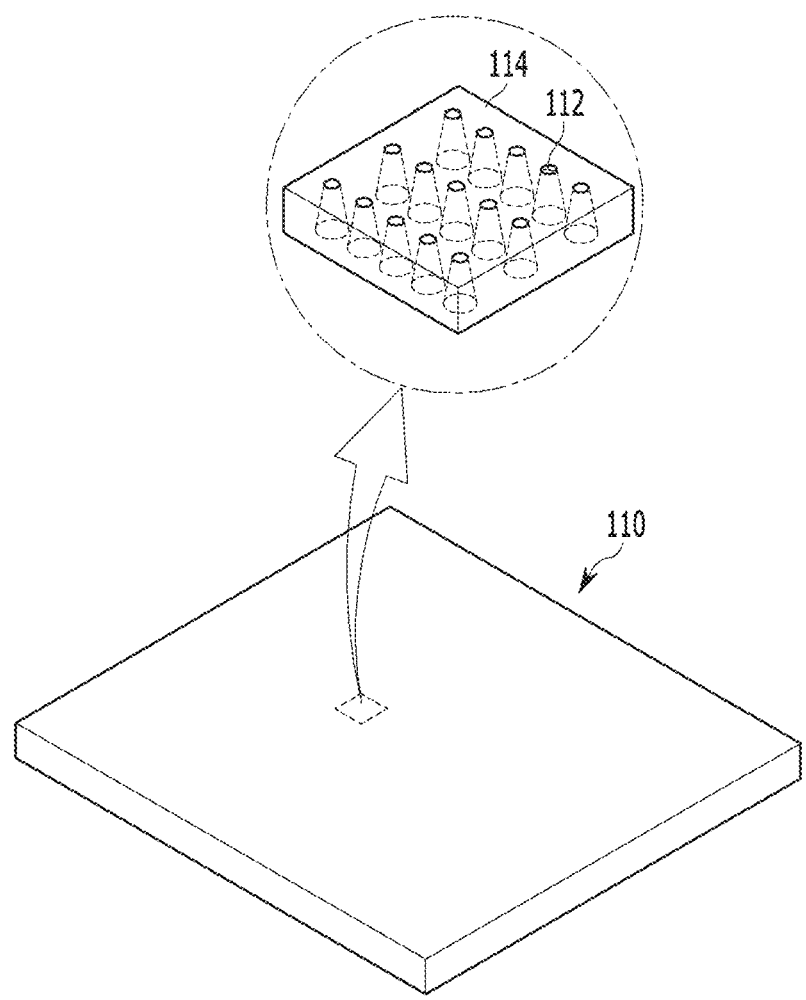
FIG. 3 shows an exemplary variation of a first film shown in FIG. 2.

FIG. 3 shows an exemplary variation of a first film 110 shown in FIG. 2, and the cross-sectional area of the hole 112 provided in the first side of the first film 110 may be formed to be different from the cross-sectional area of the hole 112 provided in the second side of the first film 110 facing the first side of the first film 110. Therefore, the shape of the lateral side of the hole 112 that is viewed in the direction perpendicular to the cross-section, such as a truncated circular cone shape, a truncated oval cone shape, or a polygonal pyramid shape, may be tapered or inversely tapered according to the shape of the cross-section.

The hole 112 of the first film 110 may be formed by a punching method, but it is not limited thereto, and it may be formed by laser processing, a photoresist process, and other methods.

In this instance, the summed volume of a plurality of holes 112 may be about equal to or greater than 5% and equal to or less than 50% of the volume of the first film 110 in which the holes 112 are not formed. When a plurality of holes 112 are formed in the first film 110 according to the present exemplary embodiment, and an external force is applied to the first film 110, the applied external force may be dispersed more efficiently by the holes 112 and the first film 110 being deformed. Therefore, the characteristic of impact resistance may be improved by easing the impact caused by the external force, and deformation may be more easily performed, so the flexible display device 1000 with a curvature radius that is about equal to or greater than 1 mm and equal to or less than 5 mm may be provided.

The thickness of the first film 110 is about equal to or greater than 10 μm and equal to or less than 250 μm. Compared to this, the thickness of the second film 120 and the hard coated layer 140 (see FIG. 1) are respectively about equal to or greater than 10 μm and equal to or less than 60 μm. In the present exemplary embodiment, the window 100 for a flexible display device for improving the characteristic of impact resistance by varying the thickness of the first film 110 is provided. As described above, the thickness of the window 100 for the flexible display device 1000 is about equal to or greater than 100 μm and equal to or less than 300 μm.

Table 1 to Table 3 express the impact forces applied to the window 100 for respective heights from which a pen drops according to a variation of the volume caused by formation of the holes 112 of the first film 110. Table 1 to Table 3 express the results acquired by calculating the intensity of impact forces generated for respective pen drop heights by varying the thickness of the first film 110 while fixing the modulus of the first film 110 (1.5 GPa).

Table 1 expresses a case when the sum of volumes of a plurality of holes 112 is 5% of the entire volume of the first film 110, Table 2 expresses a case when the sum of volumes of a plurality of holes 112 is 30% of the entire volume of the first film 110, and Table 3 expresses a case when the sum of volumes of a plurality of holes 112 is 50% of the entire volume of the first film 110. Here, the volume of the first film 110 is measured from the entire film shape before the holes 112 are formed, and the volume of the holes 112 is inversely calculated from the volume reduced from the first film 110 after the holes 112 are formed.

A weight of the pen used for the pen drop test is 5.58 g, speeds and impact amounts are measured, data on contact times are acquired, and the impact forces are calculated according to the law of momentum conservation.

TABLE 1

| | Classification | Comparative Example | Experimental Example 1 | Experimental Example 2 | Experimental Example 3 | Experimental Example 4 | Experimental Example 5 | Experimental Example 6 |
|---|---|---|---|---|---|---|---|---|
| Structure (thickness: μm) | Hard coated layer | 30 | 30 | 30 | 30 | 30 | 30 | 30 |
| | Second film | 30 | 30 | 30 | 30 | 30 | 30 | 30 |
| | buffer layer | 10 | 10 | 10 | 10 | 10 | 10 | 10 |
| | First film | 40 | 40 | 50 | 100 | 150 | 200 | 250 |
| | Change of volume when first film is pressed | 0.0 | 2.0 | 2.5 | 5.0 | 7.5 | 10.0 | 12.5 |
| | First adhesive layer | 50 | 50 | 50 | 50 | 50 | 50 | 50 |
| | Display panel | 35 | 35 | 35 | 35 | 35 | 35 | 35 |
| | Second adhesive layer | 50 | 50 | 50 | 50 | 50 | 50 | 50 |
| | Protection film | 35 | 35 | 35 | 35 | 35 | 35 | 35 |
| Impact force (N) | 1 cm | 5.0 | 4.9 | 4.9 | 4.8 | 4.7 | 4.6 | 4.5 |
| | 2 cm | 9.9 | 9.8 | 9.7 | 9.5 | 9.3 | 9.1 | 8.9 |
| | 3 cm | 14.9 | 14.6 | 14.6 | 14.3 | 14.0 | 13.7 | 13.4 |
| | 4 cm | 19.9 | 19.5 | 19.4 | 19.0 | 18.6 | 18.2 | 17.9 |
| | 5 cm | 24.9 | 24.4 | 24.3 | 23.8 | 23.3 | 22.8 | 22.3 |
| | 6 cm | 29.8 | 29.3 | 29.2 | 28.5 | 27.9 | 27.3 | 26.8 |
| | 7 cm | 34.8 | 34.2 | 34.0 | 33.3 | 32.6 | 31.9 | 31.2 |
| | 8 cm | 39.8 | 39.1 | 38.9 | 38.0 | 37.2 | 36.5 | 35.7 |
| | 9 cm | 44.7 | 43.9 | 43.7 | 42.8 | 41.9 | 41.0 | 40.2 |

TABLE 2

| | Classification | Comparative Example | Experimental Example 7 | Experimental Example 8 | Experimental Example 9 | Experimental Example 10 | Experimental Example 11 | Experimental Example 12 |
|---|---|---|---|---|---|---|---|---|
| Structure (thickness: μm) | Hard coated layer | 30 | 30 | 30 | 30 | 30 | 30 | 30 |
| | Second film | 30 | 30 | 30 | 30 | 30 | 30 | 30 |
| | buffer layer | 10 | 10 | 10 | 10 | 10 | 10 | 10 |
| | First film | 40 | 40 | 50 | 100 | 150 | 200 | 250 |
| | Change of volume when first film is pressed | 0.0 | 12.0 | 15.0 | 30.0 | 45.0 | 60.0 | 75.0 |
| | First adhesive layer | 50 | 50 | 50 | 50 | 50 | 50 | 50 |
| | Display panel | 35 | 35 | 35 | 35 | 35 | 35 | 35 |
| | Second adhesive layer | 50 | 50 | 50 | 50 | 50 | 50 | 50 |
| | Protection film | 35 | 35 | 35 | 35 | 35 | 35 | 35 |
| Impact force (N) | 1 cm | 5.0 | 4.5 | 4.4 | 3.9 | 3.5 | 3.2 | 3.0 |
| | 2 cm | 9.9 | 9.0 | 8.7 | 7.8 | 7.1 | 6.4 | 5.9 |
| | 3 cm | 14.9 | 13.4 | 13.1 | 11.7 | 10.6 | 9.7 | 8.9 |
| | 4 cm | 19.9 | 17.9 | 17.5 | 15.6 | 4.1 | 12.9 | 11.8 |
| | 5 cm | 24.9 | 22.4 | 21.9 | 19.5 | 17.6 | 16.1 | 14.8 |
| | 6 cm | 29.8 | 26.9 | 26.2 | 23.4 | 21.2 | 19.3 | 17.7 |
| | 7 cm | 34.8 | 31.4 | 30.6 | 27.3 | 24.7 | 22.5 | 20.7 |
| | 8 cm | 39.8 | 35.9 | 35.0 | 31.2 | 28.2 | 25.7 | 23.6 |
| | 9 cm | 44.7 | 40.3 | 39.4 | 35.2 | 31.8 | 29.0 | 26.6 |

TABLE 3

| | Classification | Comparative Example | Experimental Example 13 | Experimental Example 14 | Experimental Example 15 | Experimental Example 16 | Experimental Example 17 | Experimental Example 18 |
|---|---|---|---|---|---|---|---|---|
| Structure (thickness: μm) | Hard coated layer | 30 | 30 | 30 | 30 | 30 | 30 | 30 |
| | Second film | 30 | 30 | 30 | 30 | 30 | 30 | 30 |
| | buffer layer | 10 | 10 | 10 | 10 | 10 | 10 | 10 |
| | First film | 40 | 40 | 50 | 100 | 150 | 200 | 250 |
| | Change of volume when first film is pressed | 0.0 | 12.0 | 15.0 | 30.0 | 45.0 | 60.0 | 75.0 |
| | First adhesive layer | 50 | 50 | 50 | 50 | 50 | 50 | 50 |
| | Display panel | 35 | 35 | 35 | 35 | 35 | 35 | 35 |
| | Second adhesive layer | 50 | 50 | 50 | 50 | 50 | 50 | 50 |
| | Protection film | 35 | 35 | 35 | 35 | 35 | 35 | 35 |
| Impact force (N) | 1 cm | 5.0 | 4.2 | 4.1 | 3.4 | 3.0 | 2.6 | 2.3 |
| | 2 cm | 9.9 | 8.4 | 8.1 | 6.8 | 5.9 | 5.2 | 4.7 |
| | 3 cm | 14.9 | 12.6 | 12.2 | 10.3 | 8.9 | 7.8 | 7.0 |
| | 4 cm | 19.9 | 16.8 | 16.2 | 13.7 | 11.8 | 10.4 | 9.3 |
| | 5 cm | 24.9 | 21.0 | 20.3 | 17.1 | 14.8 | 13.0 | 11.6 |
| | 6 cm | 29.8 | 25.2 | 24.3 | 20.5 | 17.7 | 15.6 | 14.0 |
| | 7 cm | 34.8 | 29.4 | 28.4 | 23.9 | 20.7 | 18.2 | 16.3 |
| | 8 cm | 39.8 | 33.7 | 32.4 | 27.3 | 23.6 | 20.8 | 18.6 |
| | 9 cm | 44.7 | 37.9 | 36.5 | 30.8 | 26.6 | 23.4 | 20.9 |

As expressed in Table 1 to Table 3, it is found that as the first film 110 becomes thicker, the intensity of the generated impact force is reduced. It is also found that as the volume of the holes 112 formed in the first film 110 increases, the intensity of the generated impact force is reduced.

The modulus of the first film 110 is about equal to or greater than 1.0 GPa and equal to or less than 1.5 GPa. Table 4 expresses the results acquired by measuring the heights at which spearing is generated by the hardness and the pen drop while varying the thickness and the modulus of the first film 110. Spearing means a depressed portion which is generated by a dropped pen on a window in a pen-drop experiment. In other words, spearing is like a scar generated by a dropped pen on a window.

TABLE 4

| Classification | Experimental Example 19 | Experimental Example 20 | Experimental Example 21 | Experimental Example 22 | Experimental Example 23 | Experimental Example 24 |
|---|---|---|---|---|---|---|
| Thickness | 50 um | 100 um | 50 um | 100 um | 50 um | 100 um |
| Modulus | 0.07 GPa | 0.15 GPa | 1.50 GPa | 1.45 GPa | 2.21 GPa | 2.2 GPa |
| Hardness of pencil | 4 B | 4 B | 4 B | H | H | 4 H |
| Pen drop | <1 cm | <1 cm | <1 cm | <6 cm | <2 cm | <1 cm |

As expressed in Table 4, when Experimental Examples 19, 21, and 23 having the same thickness are compared, it is found that, in the case of Experimental Example 19 in which the modulus of the first film 110 is less than 1.0 GPa or the case of Experimental Example 23 in which the modulus is greater than 1.5 GPa, cracks may be generated by the pen drop from a low height. However, in the case of Experimental Example 23, the modulus is high so it may be expected to have high hardness compared to Experimental Examples 19 and 21, and the height for generating cracks by the pen drop is somewhat high, which however generates no large difference from Experimental Examples 19 and 21.

Further, when Experimental Examples 21 and 22 that correspond to the range that is equal to or greater than 1.0 GPa and equal to or less than 1.5 GPa which is the modulus range of the first film 110 are compared, it is found that higher hardness may be acquired when the first film 110 is thick, and the height at which the cracks are generated by the pen drop is remarkably high.

Figure 4:
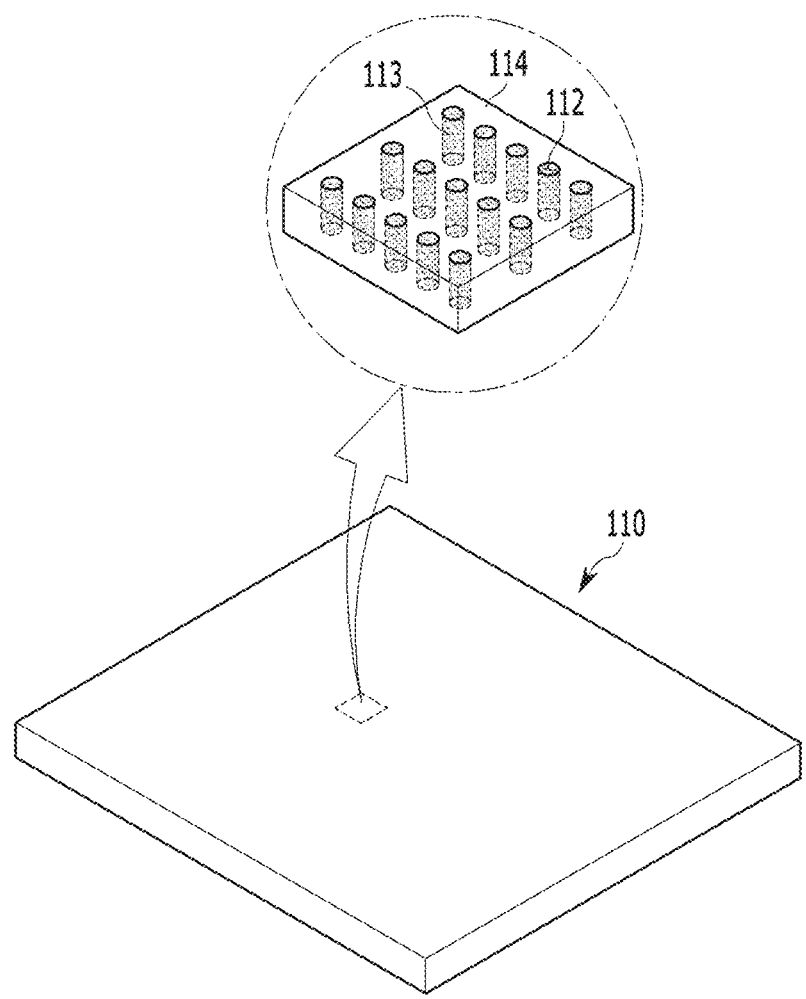
FIG. 4 shows another exemplary variation of a first film shown in FIG. 2.
Figure 5:
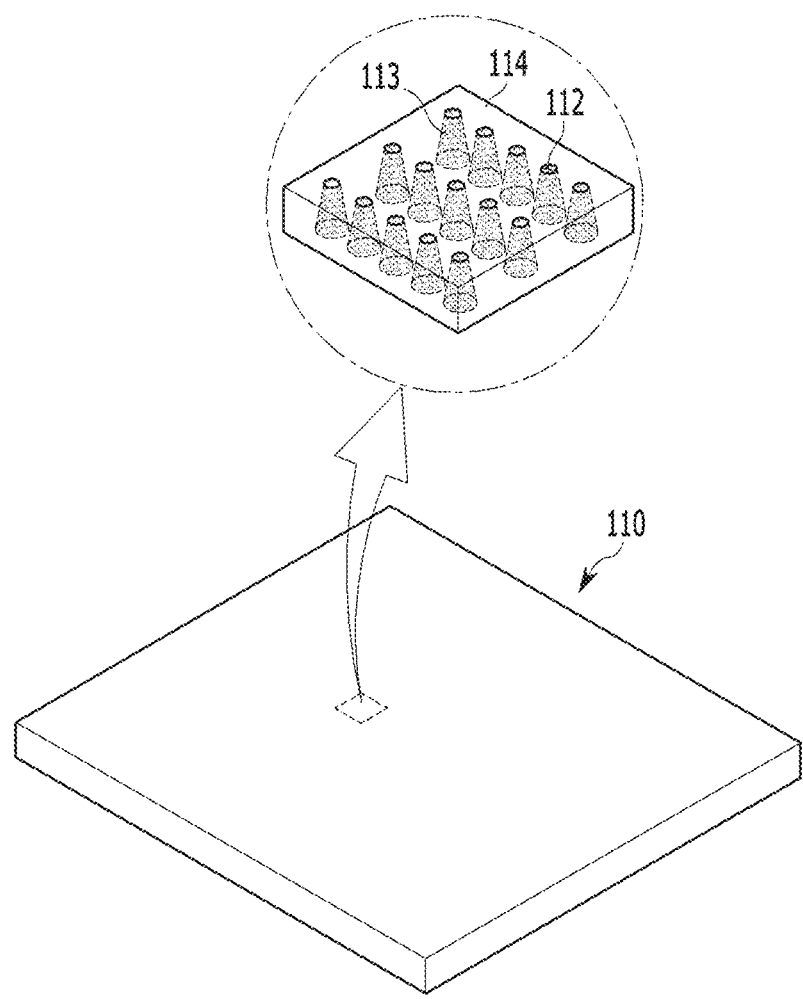
FIG. 5 shows a first film according to an exemplary variation of FIG. 3.

A filler 113 may be filled inside the holes 112 of the first film 110. FIG. 4 illustrates another exemplary variation of a first film 110 shown in FIG. 2, showing that the filler 113 is filled in the holes 112 of the first film 110 shown in FIG. 2. FIG. 5 illustrates a first film 110 according to an exemplary variation of FIG. 3, showing that the filler 113 is filled in the holes 112 of the first film 110 shown in FIG. 3.

In this instance, the filler 113 according to the present exemplary variations may be a transparent polymer with a modulus that is lower than the modulus of the base film 114 of the first film 110. Since the filler 113 is filled in the holes 112, the stress generated by a deformation when the flexible display device 1000 is deformed may be dispersed or eased to prevent damage caused by the deformation and support the deformation more easily.

Figure 6:
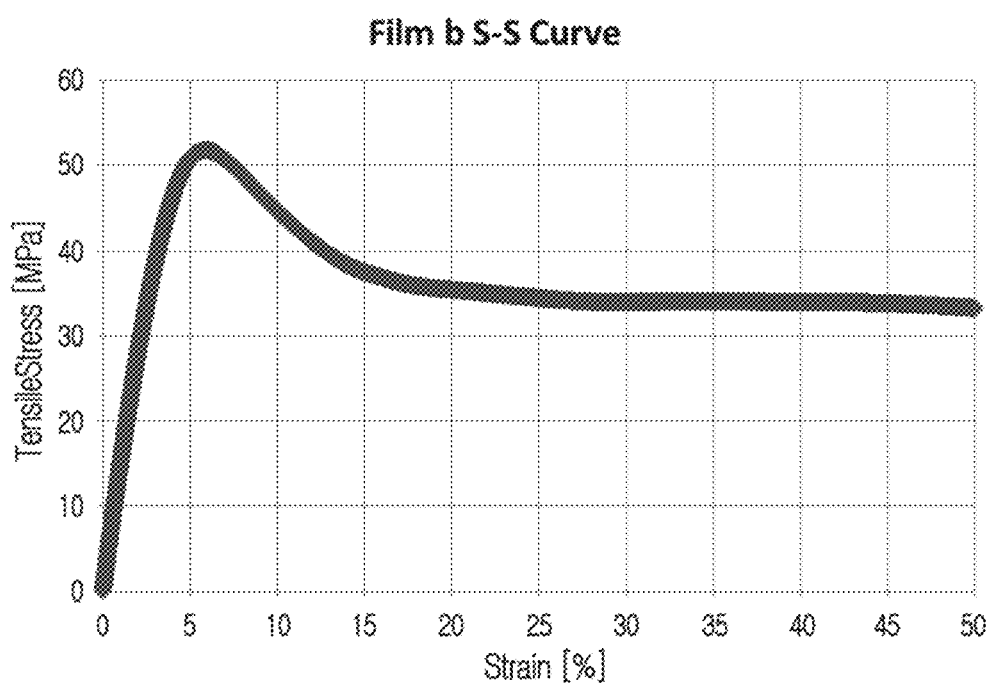
FIG. 6 shows a graph for measuring elastic deformation of a first film according to an exemplary embodiment.

FIG. 6 and Table 5 show the results acquired by measuring strains that are generated when the flexible display device 1000 is folded to have a curvature radius of 1 mm while changing the thickness of the first film 110 included in the window 100. FIG. 6 illustrates a graph for measuring elastic deformation of a first film 110 according to an exemplary embodiment, as described above, showing a graph of the change of stress and strain according to the result of measuring the strain generated when the flexible display device 1000 is folded to have a curvature radius of 1 mm while varying the thickness of the first film 110 included in the window 100. Table 5 expresses the numerical experimental data. In this instance, the modulus of the first film 110 used for the present test is 1.5 GPa, and the first film 110 is measured by use of thermoplastic polyurethane (TPU). Further, the strain of the first film 110 is inferred according to theoretic calculated values through the surface strain and Computer Aided Engineering (CAE) analysis results. As is well known to those of skill in the art, CAE is a computer-assisted process of analysis. It is a technology that applies the computer to the field of product design and development. It corresponds to a simulation using a computer.

It is found from the graph of FIG. 6 that the strain of a linear section in which the first film 110 according to the present exemplary embodiment is elastically deformed is about 3.5%, and this result is determined to be the same as the result of Table 5 in which the first film 110 is calculated to have the strain of 3.61% when the first film 110 is 250 μm thick. Further, it is found from Table 5 that the anticipated pen drop height in the section in which the first film 110 is elastically deformed is not greater than 8 cm.

The buffer layer 130 according to the present exemplary embodiment may include a material in which the storage modulus increases when an external force is applied. A detailed content on the material is disclosed in the thesis entitled "Study of shear-stiffened elastomers (Smart Mater. Struct. 21 2012 125009 (6pp)", which is herein incorporated by reference in its entirety, so it will be replaced with the content in the thesis and will be omitted in the present specification.

Figure 7:
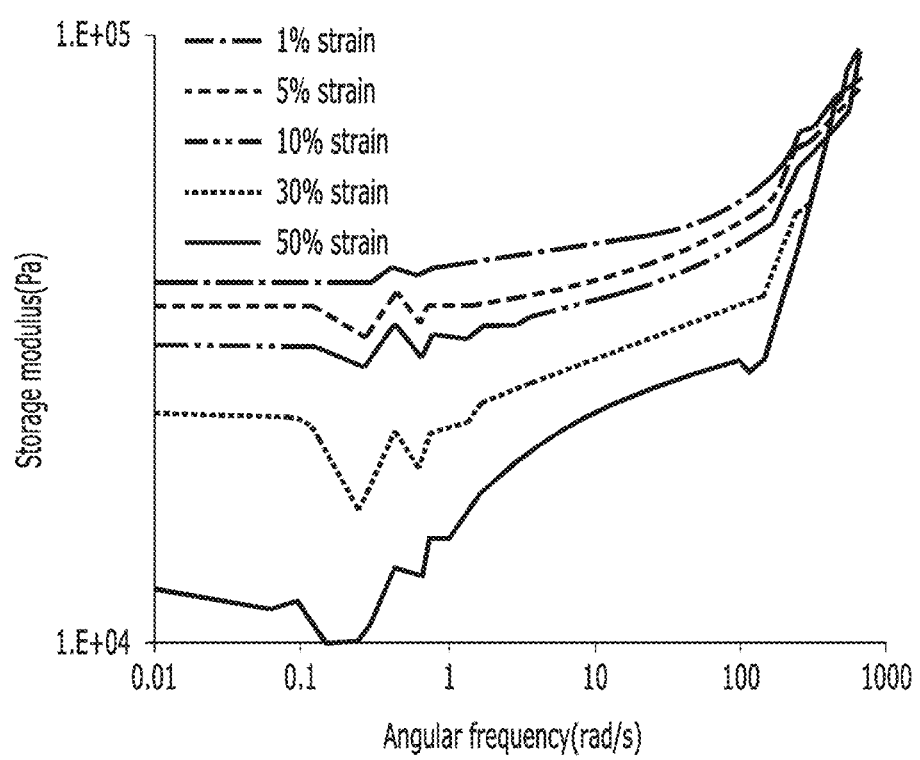
FIG. 7 shows a graph for measuring a storage modulus increase when an external force is applied to a buffer layer according to an exemplary embodiment.

FIG. 7 shows a graph for measuring a storage modulus increase when an external force is applied to a buffer layer 130 according to an exemplary embodiment, which is also shown in the thesis, cited above. As shown in FIG. 7, the buffer layer 130 according to the present exemplary embodiment may include a material of which the storage modulus value temporarily increases by the external stimulus provided from the outside.

As described, when the external force is applied to a partial area of the window 100, by the buffer layer 130 including a material of which the storage modulus value temporarily increases by the external stimulus, the storage modulus may increase in the corresponding area to which the external force is instantly applied so the impact easing effect may be further improved. The buffer layer 130 may maintain the low storage modulus in the area in which the external force is not applied, and after the external force is removed, the storage modulus returns to the original state to maintain the storage modulus and keep the flexibility.

Figure 8:
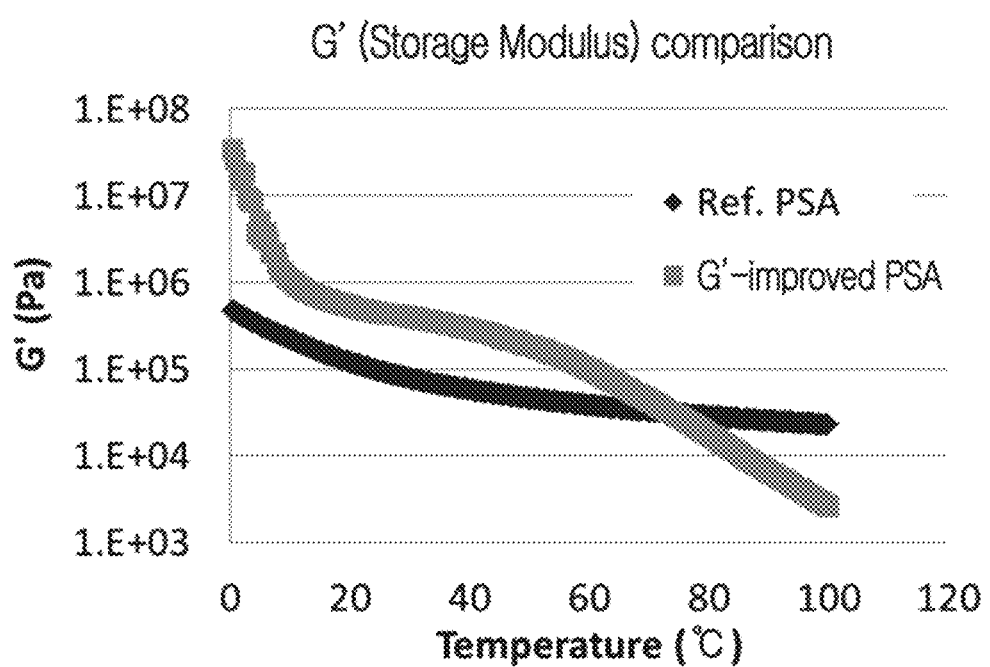
FIG. 8 shows a graph for measuring changes of a storage modulus with respect to temperature of a buffer layer according to an exemplary embodiment.

FIG. 8 shows a graph for measuring changes of a storage modulus with respect to temperature of a buffer layer according to an exemplary embodiment. FIG. 8 shows the results that the storage modulus value is increased by the external stimulus with respect to temperature. As shown in FIG. 8, an increase width of the Example of the storage modulus of the buffer layer 130 is equal to or greater than $10^4$ Pa and equal to or less than $10^5$ Pa with respect to the Comparative Example.

By the buffer layer 130 of which the storage modulus value is variable by whether the external stimulus is applied or not according to the present exemplary embodiment, the window 100 for using flexibility to allow elastic deformation when there is no external stimulus, and increasing the storage modulus value and thereby preventing generation of

TABLE 5

| | | | | | | | |
|---|---|---|---|---|---|---|---|
| Thickness (mm) | Protection film | 0.035 | 0.035 | 0.035 | 0.035 | 0.035 | 0.035 |
| | Second adhesive layer 400 | 0.05 | 0.05 | 0.05 | 0.05 | 0.05 | 0.05 |
| | Display panel 200 | 0.035 | 0.035 | 0.035 | 0.035 | 0.035 | 0.035 |
| | First adhesive layer 300 | 0.05 | 0.05 | 0.05 | 0.05 | 0.05 | 0.05 |
| Thicknesses (mm) of layers of window | First film 110 | 0.03 | 0.05 | 0.1 | 0.15 | 0.2 | 0.25 |
| | buffer layer 130 | 0.01 | 0.01 | 0.01 | 0.01 | 0.01 | 0.01 |
| | Second film 120 | 0.03 | 0.03 | 0.03 | 0.03 | 0.03 | 0.03 |
| | Hard coated layer 140 | 0.03 | 0.03 | 0.03 | 0.03 | 0.03 | 0.03 |
| Strains of first 110 film | Surface strain (Theoretic calculated values) | 0.31% | 0.33% | 0.38% | 0.44% | 0.52% | 0.63% |
| | CAE analysis results | 1.8% | 1.90% | 2.19% | 2.55% | 3.02% | 3.61% |
| Anticipated pen drop heights | | 3 cm | 3 cm | 5 cm | 5 cm | 7 cm | 8 cm | cracks by the impact caused by an external stimulus when the external stimulus is applied, the characteristic of impact resistance may be improved. The buffer layer 130 may exemplarily include a silicon oil.

The window 100 for a flexible display device according to an exemplary embodiment and exemplary variations, and the flexible display device 1000 including the same, have been described. According to the present disclosure, the window 100 for a flexible display device for maintaining the entire thickness in a predetermined range, improving the characteristic of impact resistance, and having a small curvature radius to be usable for the flexible display device 1000, and the flexible display device 1000 including the same, may be provided.

Specific exemplary embodiments have been described and illustrated above, but the inventive concept is not limited to the above-mentioned exemplary embodiments. Therefore, the inventive concept can be variously changed and modified from the description by a person skilled in the art to which the inventive concept pertains without departing from the idea and scope of the inventive concept. Therefore, the modified examples or the changed examples are not to be individually construed from the technical spirit or aspect of the inventive concept, and therefore, the modified exemplary embodiments are to be construed to be included in the claims of the inventive concept.

What is claimed is:

1. A window for a flexible display device, comprising:
a first film including a base film and a plurality of unfilled holes passing through the base film;
a second film overlapping the first film;
a buffer layer between the first film and the second film to attach a first side of the first film and a first side of a second film, the buffer layer includes an elastic material for easing an impact by delaying a force transmission time when an external force is applied; and
a hard coated layer on a second side of the second film,
wherein the plurality of unfilled holes are formed in an entirety of the base film, and
wherein a sum of volumes of the unfilled holes is equal to or greater than 5% and equal to or less than 50% of a volume of the first film, wherein the unfilled holes are configured to disperse the external force.

2. The window of claim 1, wherein
a cross-section of the unfilled holes in the first side of the first film and a cross-section of the unfilled holes in a second side of the first film have a same column shape.

3. The window of claim 1, wherein
areas of a cross-section of the unfilled holes in the first side of the first film and a cross-section of the unfilled holes in a second side of the first film facing the first side of the first film are different from each other, such that the unfilled holes have different truncated cone shapes.

4. The window of claim 1, wherein
at least one of the first film and the second film comprises at least one of a colorless polyimide (CPI), a thermoplastic polyurethane (TPU), a triacetyl cellulose (TAC) film, a polycarbonate (PC), a poly(methyl methacrylate) (PMMA), a cyclo-olefin polymer (COP), a polyurethane, a polyethylene terephthalate (PET), a polyethylene (PE), and an oriented polypropylene (OPP).

5. The window of claim 1, wherein
a thickness of the first film is equal to or greater than 10 μm and equal to or less than 250 μm.

6. The window of claim 1, wherein
a Young's modulus of the first film is equal to or greater than 1.0 GPa and equal to or less than 1.5 Gpa.

7. The window of claim 1, wherein
a thickness of the second film is equal to or greater than 10 μm and equal to or less than 60 μm.

8. The window of claim 1, wherein
the elastic material is a material of which a storage modulus increases when an the external force is applied.

9. The window of claim 8, wherein
the storage modulus of the buffer layer increases by a range that is equal to or greater than $10^4$ Pa and equal to or less than $10^5$ Pa.

10. The window of claim 7, wherein
the buffer layer includes a silicon oil.

11. The window of claim 1, wherein
a thickness of the buffer layer is equal to or greater than 10 μm and equal to or less than 30 μm.

12. The window of claim 1, wherein
the hard coated layer comprises at least one of an organic, inorganic, and organic/inorganic hybrid material.

13. The window of claim 1, wherein
a thickness of the hard coated layer is equal to or greater than 10 μm and equal to or less than 60 μm.

14. The window of claim 1, wherein
a thickness of the window is equal to or greater than 100 μm and equal to or less than 300 μm.

15. A flexible display device comprising:
a display panel;
a window on a first side of the display panel; and
a first adhesive layer between the display panel and the window to attach the first side of the display panel and a first side of the window,
wherein the window includes:
a first film including a base film and a plurality of unfilled holes passing through the base film;
a second film overlapping the first film;
a buffer layer between the first film and the second film to attach a first side of the first film and a first side of a second film, the buffer layer includes an elastic material for easing an impact by delaying a force transmission time when an external force is applied; and
a hard coated layer on a second side of the second film,
wherein the plurality of unfilled holes are formed in the entirety of the base film,
wherein a sum of volumes of the unfilled holes is equal to or greater than 5% and equal to or less than 50% of a volume of the first film, wherein the unfilled holes are configured to disperse the external force.

16. The flexible display device of claim 15, further comprising:
a protection film on a second side of the display panel; and
a second adhesive layer between the display panel and the protection film to attach the second side of the display panel and a first side of the protection film.

* * * * *